United States Patent
Calciu et al.

(10) Patent No.: US 11,126,464 B2
(45) Date of Patent: Sep. 21, 2021

(54) USING CACHE COHERENT FPGAS TO ACCELERATE REMOTE MEMORY WRITE-BACK

(71) Applicant: VMware, Inc., Palo Alto, CA (US)

(72) Inventors: Irina Calciu, Palo Alto, CA (US);
Jayneel Gandhi, Sunnyvale, CA (US);
Aasheesh Kolli, Palo Alto, CA (US);
Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 112 days.

(21) Appl. No.: 16/048,178

(22) Filed: Jul. 27, 2018

(65) Prior Publication Data
US 2020/0034200 A1    Jan. 30, 2020

(51) Int. Cl.
| H04L 29/12 | (2006.01) |
| G06F 9/50 | (2006.01) |
| G06F 15/173 | (2006.01) |
| G06F 12/0891 | (2016.01) |
| G06F 9/455 | (2018.01) |

(Continued)

(52) U.S. Cl.
CPC ........ *G06F 9/5016* (2013.01); *G06F 9/45558* (2013.01); *G06F 12/0891* (2013.01); *G06F 15/17331* (2013.01); G06F 2009/45583 (2013.01); *H04L 49/30* (2013.01); *H04L 67/2842* (2013.01)

(58) Field of Classification Search
CPC ............. H04L 67/2842; H04L 67/2852; H04L 67/288; H04L 67/10; H04L 49/30; G06F 12/0811; G06F 12/0815; G06F 11/1484; G06F 12/0868; G06F 9/5016; G06F 9/45558; G06F 15/17331; G06F 2009/45583; G06F 12/0891
See application file for complete search history.

(56) References Cited

U.S. PATENT DOCUMENTS

| 5,764,934 A | 6/1998 | Fisch et al. |
| 6,275,907 B1 | 8/2001 | Baumgartner et al. |
| 7,415,575 B1 | 8/2008 | Tong et al. |

(Continued)

FOREIGN PATENT DOCUMENTS

KR    20180092273 A    8/2018

OTHER PUBLICATIONS

Yang, Hsin-jung et al., LEAP Shared Memories: Automating the Construction of FPGA Coherent Memories, 2014, IEEE, pp. 117-124.

*Primary Examiner* — Jungwon Chang
(74) *Attorney, Agent, or Firm* — Patterson + Sheridan, LLP

(57) ABSTRACT

Disclosed is a method for performing write-back operations to maintain coherence of remote memories in a memory pool. When a local application makes a request for a page of memory that is in the memory pool but not local, a device obtains the page through its RDMA facility and thereafter keeps track of the page for any changes made by the application to the page by storing the page locally and monitoring cache coherency events of cache lines that make up the page. If a requested page become dirty, then periodically the dirty cache lines of the dirty page are written back to the remote memory from which the pages were obtained. In addition, all dirty cache lines are written back when the local memory storing the page becomes full or the application closes a region containing the page.

22 Claims, 8 Drawing Sheets

(51) Int. Cl.
*H04L 12/935* (2013.01)
*H04L 29/08* (2006.01)

(56) References Cited

U.S. PATENT DOCUMENTS

| | | |
|---|---|---|
| 8,413,145 B2 | 4/2013 | Chou et al. |
| 9,058,272 B1 | 6/2015 | O'Bleness et al. |
| 9,355,035 B2 | 5/2016 | Goodman et al. |
| 2005/0240745 A1 | 10/2005 | Iyer et al. |
| 2005/0273571 A1* | 12/2005 | Lyon .................. G06F 12/1072 711/203 |
| 2006/0059317 A1 | 3/2006 | Kakeda |
| 2007/0180197 A1* | 8/2007 | Wright ............... G06F 12/1027 711/141 |
| 2008/0086600 A1 | 4/2008 | Qiao |
| 2008/0127182 A1 | 5/2008 | Newport et al. |
| 2008/0209127 A1 | 8/2008 | Brokenshire et al. |
| 2009/0300289 A1 | 12/2009 | Kurts et al. |
| 2010/0274987 A1 | 10/2010 | Subrahmanyam et al. |
| 2010/0313201 A1 | 12/2010 | Warton et al. |
| 2011/0093646 A1* | 4/2011 | Koka .................. G06F 12/0817 711/103 |
| 2011/0137861 A1* | 6/2011 | Burnett .............. G06F 16/2308 707/622 |
| 2011/0252200 A1 | 10/2011 | Hendry et al. |
| 2014/0108854 A1 | 4/2014 | Antony et al. |
| 2014/0201460 A1 | 7/2014 | Blaner et al. |
| 2015/0052309 A1 | 2/2015 | Philip et al. |
| 2015/0095576 A1* | 4/2015 | Subrahmanyam .. G06F 12/0891 711/119 |
| 2015/0095585 A1 | 4/2015 | Subrahmanyam et al. |
| 2016/0253197 A1* | 9/2016 | Bonzini ............... G06F 9/45558 718/1 |
| 2016/0321181 A1 | 11/2016 | Kaxiras et al. |
| 2017/0031825 A1 | 2/2017 | Chen et al. |
| 2017/0192886 A1 | 7/2017 | Boehm et al. |
| 2018/0189087 A1 | 7/2018 | Palermo et al. |
| 2018/0239707 A1* | 8/2018 | Tsirkin ............... G06F 12/0875 |
| 2018/0373553 A1 | 12/2018 | Connor et al. |
| 2018/0373561 A1* | 12/2018 | Nassi .................. G06F 9/5077 |
| 2019/0179750 A1* | 6/2019 | Moyer .................. G06F 3/065 |
| 2019/0207714 A1 | 7/2019 | Loewenstein et al. |
| 2019/0266101 A1* | 8/2019 | Robinson ............ G06F 12/0831 |
| 2019/0278713 A1* | 9/2019 | Gandhi ............... G06F 12/1027 |
| 2020/0034175 A1 | 1/2020 | Calciu et al. |
| 2020/0034176 A1 | 1/2020 | Calciu et al. |
| 2020/0034294 A1 | 1/2020 | Calciu et al. |
| 2020/0034297 A1 | 1/2020 | Calciu et al. |
| 2020/0125384 A1 | 4/2020 | Serebrin et al. |
| 2020/0285580 A1* | 9/2020 | Subramanian ......... G06F 13/16 |

* cited by examiner

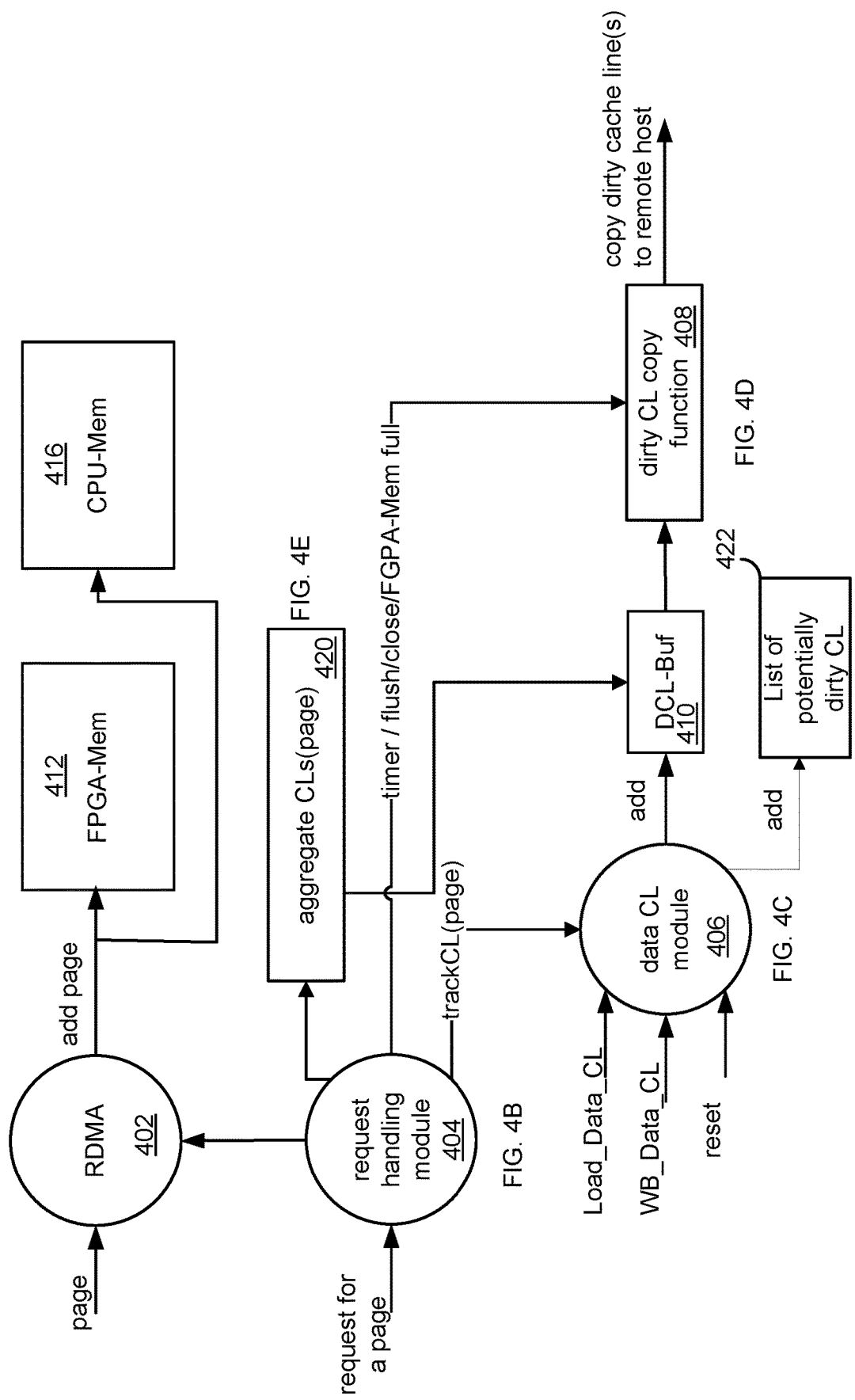

USING CACHE COHERENT FPGAS TO ACCELERATE REMOTE MEMORY WRITE-BACK

CROSS-REFERENCE TO RELATED APPLICATIONS

This application is related to:

U.S. application Ser. No. 16/048,180, filed on Jul. 27, 2018, which application is incorporated by reference in its entirety into the present application, U.S. application Ser. No. 16/048,182, filed on Jul. 27, 2018, U.S. application Ser. No. 16/048,183, filed on Jul. 27, 2018, and U.S. application Ser. No. 16/048,186, filed on Jul. 27, 2018.

BACKGROUND

Due to the current speeds of networks interconnecting host computers systems, it is possible to consider memories of these systems as having a single large pool of memory comprising the memories of each of the host or host computers. Memories in the pool can be accessed as if the memories were local, but doing so incurs expensive operations for pages that are not present locally and are made dirty by the application. This makes the single pool less than transparent to the agents, such as applications, using the pool. It is desirable to take better advantage of the higher network speeds and to use the memory in the pool more transparently.

SUMMARY

One or more embodiments employ cache coherent FPGAs to enhance remote memory write-back operations. One embodiment is a method for handling remote memory requests for a running application. The method includes receiving a request for a page from the running application, obtaining the page for the running application from a remote host responsible for the page, determining whether any cache line of the page becomes dirty due to the activities of the running application by monitoring cache coherence events relating to each cache line of the page, and periodically copying dirty cache lines of the page to the remote host.

Further embodiments include a device configured to carry out one or more aspects of the above method and a computer system configured to carry out one or more aspects of the above method.

BRIEF DESCRIPTION OF THE DRAWINGS

FIG. 4A depicts graphically the components involved in the remote memory write-back operation, in an embodiment.

DETAILED DESCRIPTION

Figure 1:
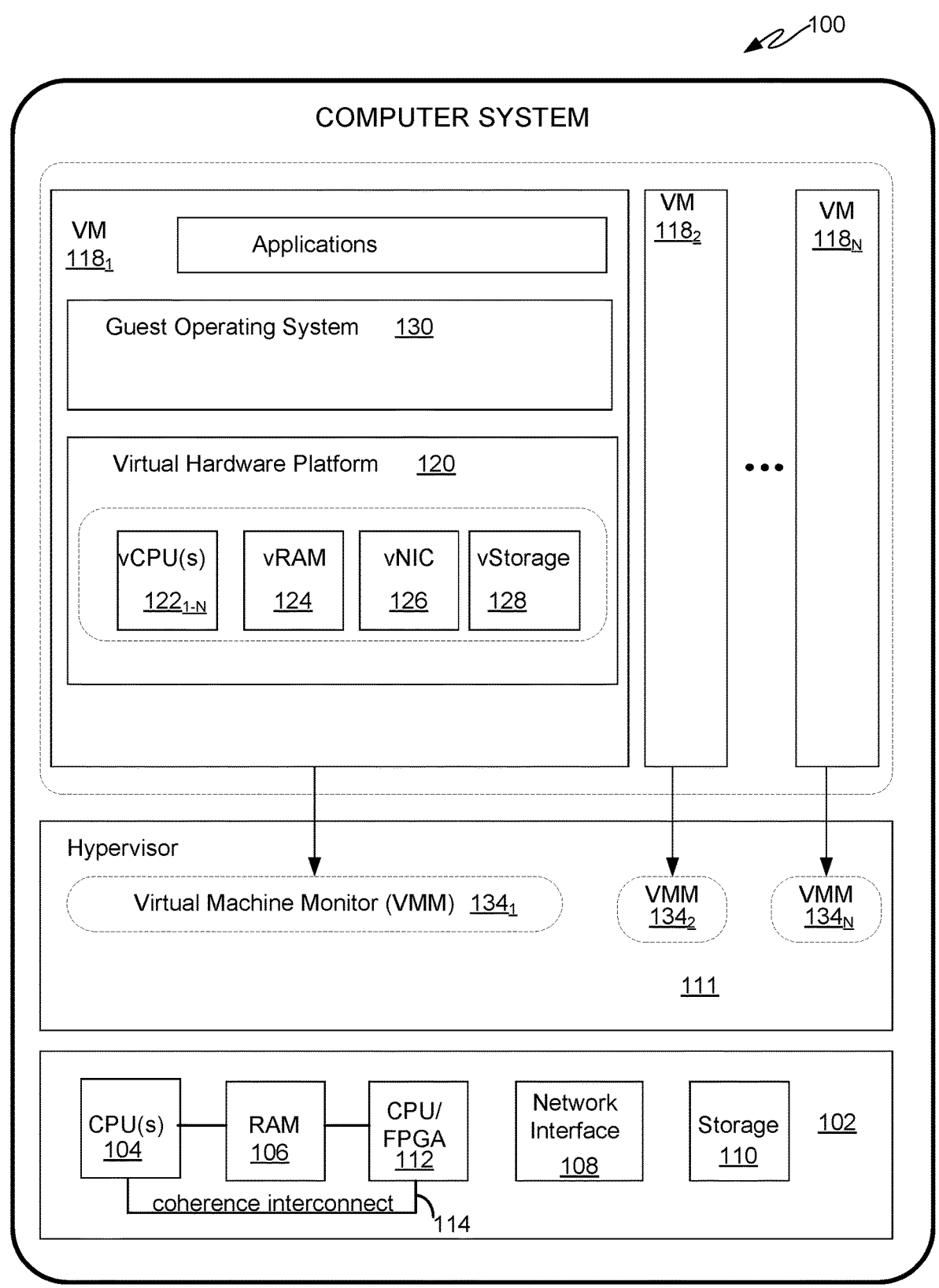
FIG. 1 depicts a block diagram of a computer system that is representative of a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more central processing units (CPUs) 104, a point-to-point coherence interconnect 114 between processors which supports a cache coherence protocol, such as the UltraPath Interconnect (UPI), random access memory (RAM) 106, one or more network interfaces 108, and persistent storage 110. In the embodiment illustrated herein, a field programmable gate array (FPGA) 112 is installed in one of the CPU sockets and communicates with one or more CPUs 104 via coherence interconnect 114.

A virtualization software layer, referred to herein after as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
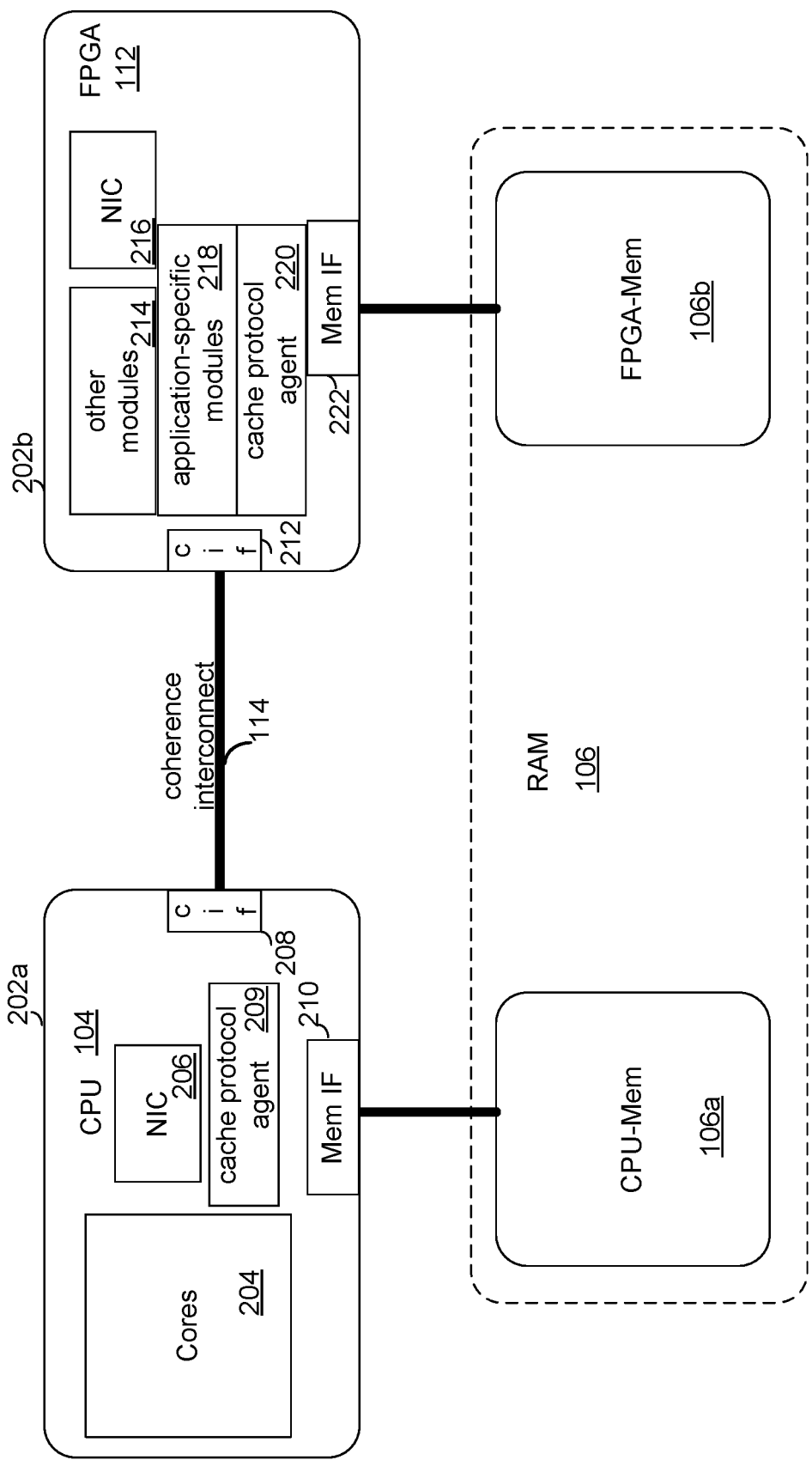
FIG. 2 depicts a block diagram of a pair of CPU sockets for CPUs in FIG. 1, in an embodiment.

FIG. 2 depicts a block diagram of a pair of CPU sockets in hardware platform 102, with a first socket 202a for CPU 104 and a second socket 202b for FPGA 112. CPU 104 includes one or more processing cores 204, a memory interface (Mem IF) 210 to CPU memory (CPU-Mem) 106a accessible by CPU 104, a network interface controller (NIC) 206, a communications interface (cif) port 208 configured to connect to coherence interconnect 114 and a cache protocol agent 209. FPGA 112 is configured with a network interface controller (NIC) 216, one or more application-specific modules 218, a cif port 212 and a cache protocol agent 220. Application specific modules 218 are configured by a bitstream representing custom programming of FPGA 112. Other modules and functions 214 whose operations are unrelated to application-specific modules 218 may be present in FPGA 112, these modules and components being configured by a bitstream different from the custom programming bitstream. FPGA 112 has a memory interface (mem IF) 222 to its own memory, FPGA memory 106b (FPGA-Mem), which is a restricted portion of RAM 106. In one embodiment, each CPU socket represents a separate Non-Uniform Memory Access (NUMA) domain. The application or the VM is running on the CPU, located on the first socket 202a, while the FPGA is on the second socket 202b.

In one embodiment, the CPU 104 has a cache (not shown in FIG. 2), which is used to reduce the average cost to access data from the memory. Data transferred between memory and cache in blocks of fixed size, called cache lines or cache blocks. When a cache line is copied from memory into the cache, a cache entry is created, which includes the copied data as well as the requested memory location (called a tag). When the CPU needs to read or write a location in the memory, it first checks for a corresponding entry in the cache. The cache checks for the contents of the requested memory location in any cache lines that might contain that address. If the processor finds that the memory location is in the cache, a cache hit has occurred; the CPU immediately reads or writes the data in the cache line. However, if the CPU does not find the memory location in the cache, a cache miss has occurred. For a cache miss, the cache allocates a new entry and copies data from main memory, then the request is fulfilled from the contents of the cache.

Cif ports 208, 212, mentioned above, support a coherence protocol, which is designed to maintain cache coherence in a system with many processors each having its own cache. With FPGA 112 residing in one socket 202b of the CPU sockets and having its own cif port 212, FPGA 112 can monitor and participate in the coherency protocol that keeps the processor caches coherent.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache.

To enforce the cache coherence protocol requires a cache protocol agent for each cache connected to a coherence interconnect. Each cache protocol agent can initiate and respond to transactions on the coherence interconnect by sending and receiving messages on the interconnect. In the present embodiments, CPU 104 has cache protocol agent 209 and FPGA 112 has cache protocol agent 220.

When a CPU accesses a cache line that is not in its cache, at any level of the cache hierarchy, cache protocol agent 209 of CPU 104 requests the cache line. Thus, cache protocol agent 209 in the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the CPU hardware caches, if it is modified, it must be written back to the memory from which it originated. The operation of writing the cache line back is present on coherence interconnect 114 as a writeback transaction and can be monitored for tracking dirty cache lines. In the case of a writeback transaction, the cache line is actually dirty, rather than potentially dirty.

To confirm whether a cache line is dirty or not, a cache protocol agent, such as agent 220 in FPGA 112, can snoop the cache line in accordance with the coherence interconnect protocol. This causes a writeback transaction to be triggered, if the cache line is dirty.

Messages corresponding to cache coherence events involved in the various embodiments described below include 'Load_Data_CL' and 'WB_Data_CL'. The 'Load_Data_CL' message occurs when a cache line (CL) is loaded as exclusive into a processor cache. A 'WB_Data_CL' message occurs when a processor writes back a cache line into memory because the cache line is dirty and is being evicted from the cache. Additionally, a 'WB_Data_CL' message can occur when a processor executes a store instruction, which bypasses the caches in the cache hierarchy. Such a store instruction is recognized by cache protocol agent 220 of FPGA 112. The messages are asynchronous messages to and from the appropriate independently operating modules and functions in the descriptions herein. More particularly, a step, 'Send(msg to dest)', is an asynchronous non-blocking transmission of a message, msg, to a destination, dest, and a step, 'Received(msg)', is a predicate, which if true is interpreted as signaling that a message, msg, has been received. If false, no message has been received, and the function or module is blocked waiting for a message to arrive. However, the function or module can configure the predicate so that by testing the predicate, the function or module can avoid being blocked. Embodiments described herein are not limited by any specific form or method of sending or receiving messages.

Figure 3:
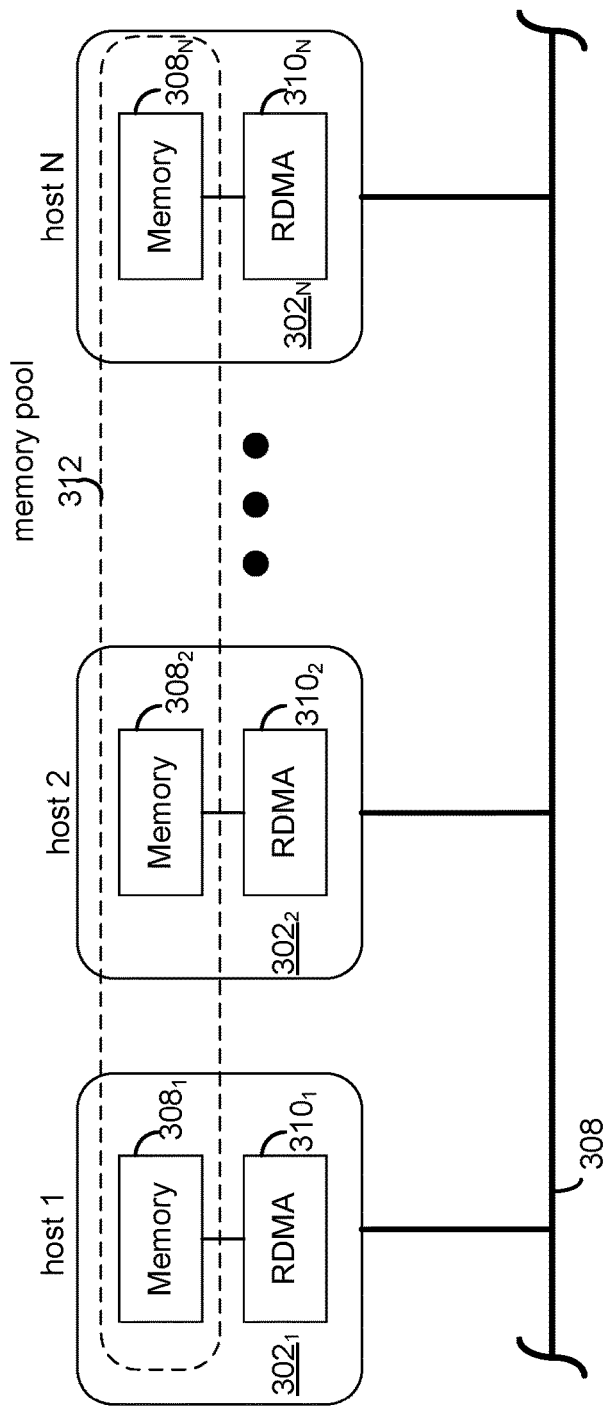
FIG. 3 depicts a pool of memories among a set of host computer systems, in an embodiment.

FIG. 3 depicts a pool of memories among a plurality of host computer systems. Each of the host computer systems $302_1$-$302_N$ includes a memory $308_1$-$308_N$ and a remote direct memory access (RDMA) facility $310_1$-$310_N$, respectively, with memories $308_1$-$308_N$ thereby forming a memory pool 312. Host computer systems $302_1$-$302_N$ are interconnected via network 308. Network 308 has sufficient speed such that an application executing on one host, say 3021, can obtain memory pages from memories $308_1$-$308_N$ of other hosts $302_2$-$302_N$ via its RDMA facility as if the memory pages were locally present. In one embodiment, a sufficient speed is a network capable of transferring a cache line, say 64 Bytes, in less than one microsecond (S). However, if host $302_1$ alters the contents of pages obtained from other hosts $302_2$-$302_N$, which are the hosts responsible for the coherence and possibly storage of those memory pages, then host $302_1$ must write back to other hosts $302_2$-$302_N$ those changes. Thus, maintaining coherence of memories in memory pool 312 involves performing efficient write-back operations. FIGS. 4A-4E depict such write-back operations in detail.

Figure 4B:
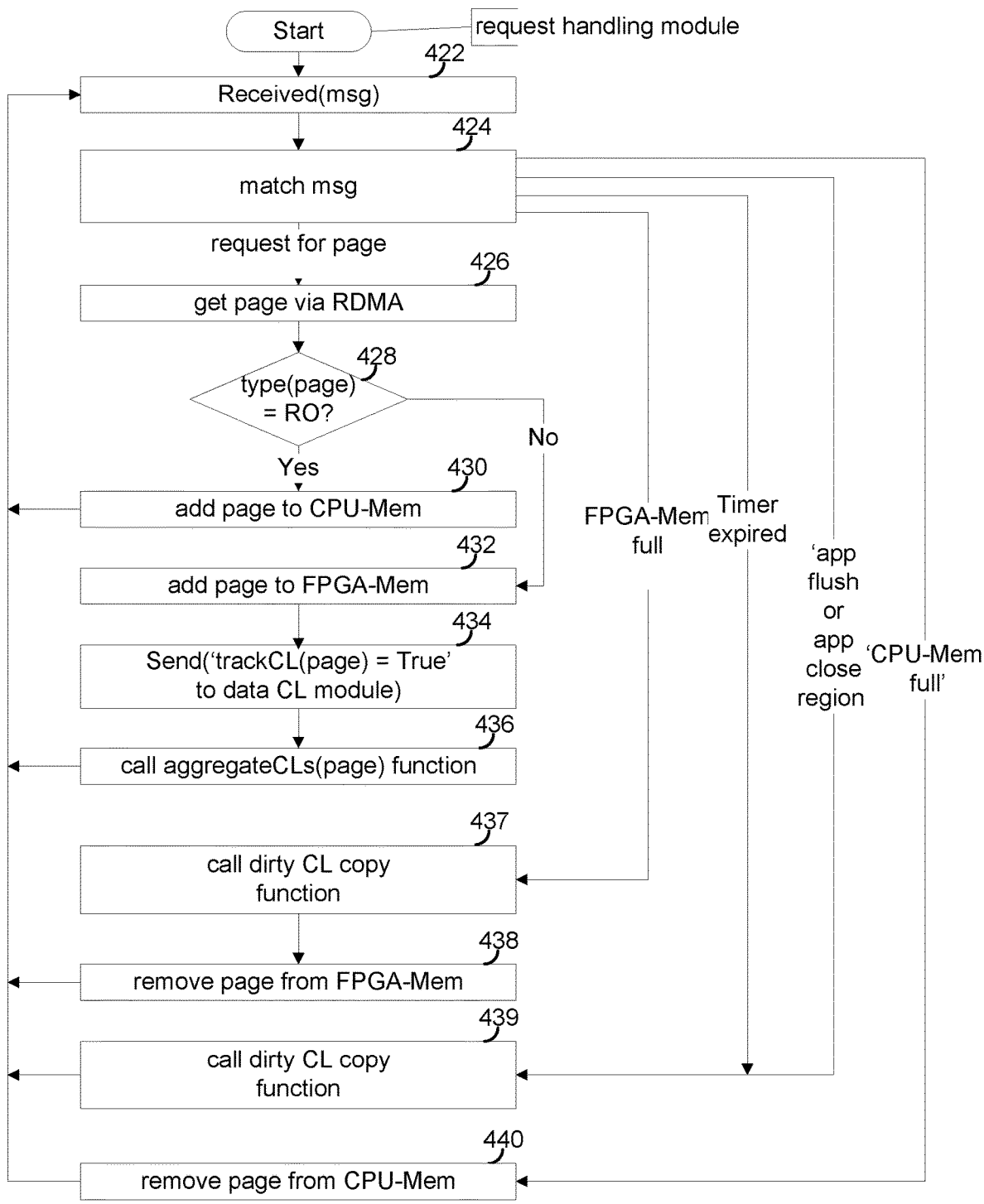
FIG. 4B depicts a flow chart for the request handling module, in an embodiment.

FIG. 4A depicts graphically the components involved in the remote memory write-back operation. The components include an RDMA facility 402, such as RDMA facilities $310_1$-$310_N$ depicted in FIG. 3, for transferring pages between remote and local memories, a request handling module 404 described in reference to FIG. 4B, a data cache line (CL) module 406 described in reference to FIG. 4C, a list 422 of potentially dirty cache lines, a dirty CL copy function 408 described in reference to FIG. 4D, an aggregate CLs function 420 described in reference to FIG. 4E. The figure also includes an FPGA memory (FPGA-Mem) 412, a CPU memory (CPU-Mem) 416, and a dirty cache line buffer (DCL-Buf) 410, which may be implemented in a number of ways. For example, the buffer can be implemented as a circular buffer of addresses of dirty cache lines, a bit map mapping the dirty cache lines of a page, an unbounded list or log of addresses of dirty cache lines, a bounded list, a hash table or a tree. In the case of the unbounded list of addresses, the list can be sorted or unsorted. In the case of a hash table, each hash bucket can represent a page and can contain a sorted or unsorted list of cache lines belonging to the page; hash buckets can be merged or coalesced if entire pages are dirty. In the case of a tree, the neighbor nodes in the tree can represent spatial locality of the pages and neighbor nodes in the tree can be merged or coalesced if entire pages are dirty.

FIG. 4B depicts a flow chart for the request handling module. In step 422, module 404 receives a message, msg, and in step 424, matches the message to either a 'request for a page', a 'time period expired', a 'FPGA-Mem full' message, an 'app flush' or an 'app close region' message.

In step 426, module 404 handles the 'request for a page' message by getting the page using RDMA facility 402. In step 428, module 404 determines whether the page is a read-only (RO) page and if so, then in step 430 adds the page to CPU-Mem 416. If module 404 determines that the page is not a RO page (i.e., is a read-write page), then in step 432 module 404 adds the page to FPGA-Mem 412 and in step 434 sends a 'trackCL(page)' message to data CL module 406 following which mode 404 calls aggregateCLs function 420 to see if any dirty cache lines can be aggregated into pages. In step 438, module 404 handles one of the 'time period expired', 'app flush' and 'app close region' messages by calling dirty CL copy function 408 to copy dirty cache lines to the remote host. In steps 437 and 438, module 404 handles the 'FPGA-Mem full' message, by calling the dirty CL copy function in step 437 and by removing a page from the FPGA-Mem in step 438. In step 440, module 404 handles the 'CPU-Mem full' message by removing a page from CPU-Mem 416. In one embodiment, module 404 is included in application-specific modules 218 in FPGA 112, which performs steps 422-440.

Figure 4C:
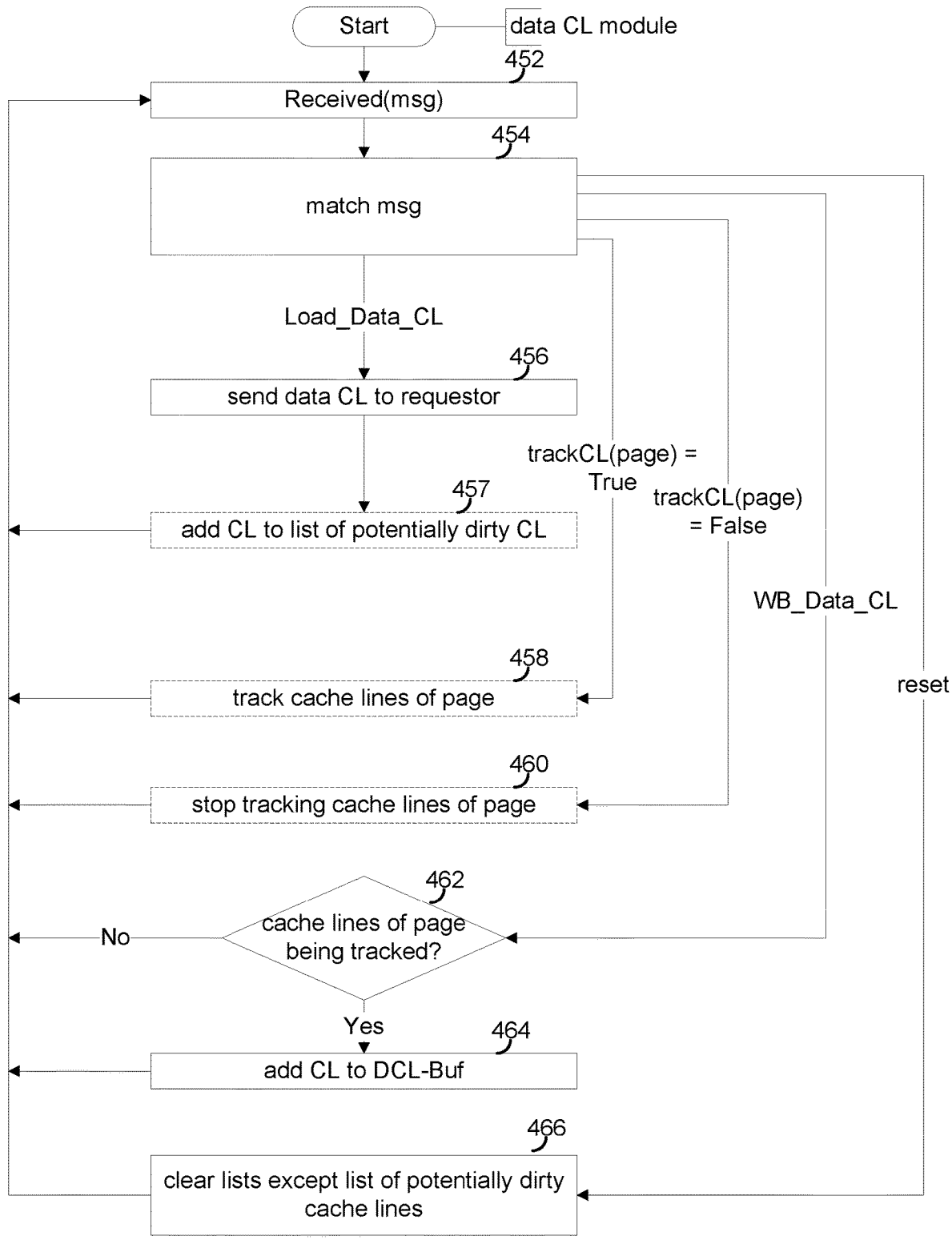
FIG. 4C depicts a flow chart for the data CL module, in an embodiment.

FIG. 4C depicts a flow chart for the data CL module. Module 406 monitors cache coherence events on coherence interconnect 114. In step 452, module 406 receives a message and in step 454, matches the message to either a 'Load_Data_CL' message, a 'WB_Data_CL' message, a 'trackCL(page)=True' message, a 'trackCL(page)=False' message or a 'reset' message. In step 456, module 406 handles the 'Load_Data_CL' message by sending the cache line (CL) to the requestor. In optional step 457, module 406 adds the cache line to list 422 of potentially dirty cache lines. In optional step 458, module 406 handles the 'trackCL (page)=True' message by starting the tracking of the cache lines of the page referred to in the message. In optional step 460, module 406 handles the 'trackCL(page)=False' message by stopping the tracking of the cache lines for the page specified in the message. In step 462, module 406 handles the 'WB_Data_CL' message by determining whether the cache lines of the page are being tracked, and if so, then in step 464, adding an entry representing the dirty cache line to DCL-Buf 410. Thus, if module 406 is tracking cache lines for a page and a coherence event, such as 'WB_Data_CL' occurs, then the cache line is entered into DCL-Buff 410 because the cache line has become dirty. In step 466, module 406 handles the 'reset' message by clearing its internal lists, e.g., DCL-Buf 410, but not list 422 of potentially dirty cache lines. In one embodiment, module 406 in included in application-specific modules in FPGA 112, which performs steps 452-466. Though Data CL module 406 can monitor cache coherence events in the present context, data CL module 406 can monitor cache coherence events in other environments as well as it monitors coherence events on a coherence interconnect between physical processors.

Figure 4D:
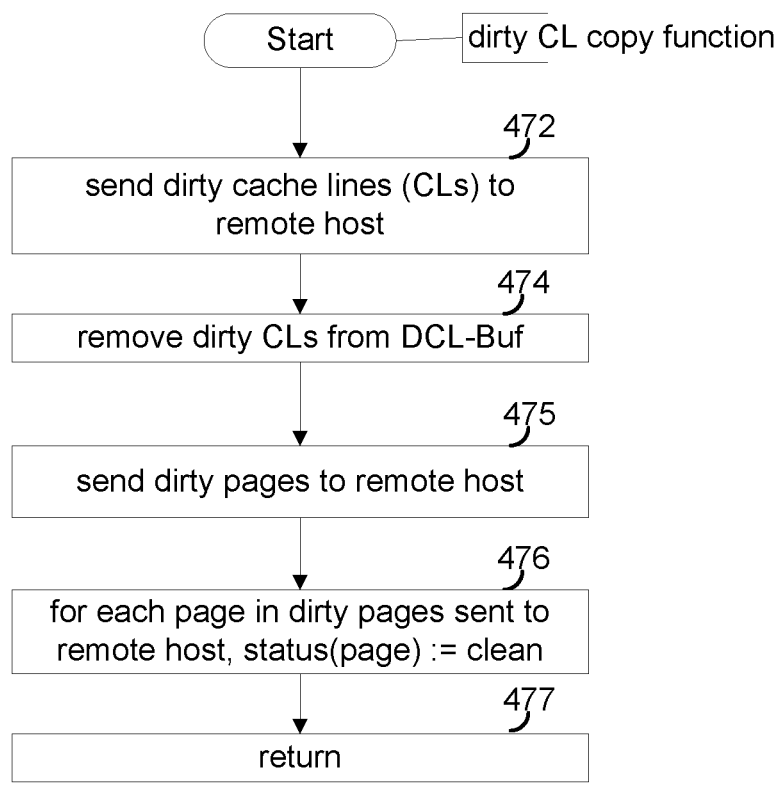
FIG. 4D depicts a flow chart of the dirty page and CL copy module, in an embodiment.

FIG. 4D depicts a flow chart of the dirty CL copy function. In step 472, function 408 sends all dirty cache lines to the remote host in step 472 and removes the dirty cache lines from DCL-Buf 410 in step 474. In step 475, function 408 sends all dirty pages to the remote host and in step 476 sets the status of each page sent to clean. In one embodiment, function 408 is included in application-specific modules 218 in FPGA 112, which performs steps 472-477.

Figure 4E:
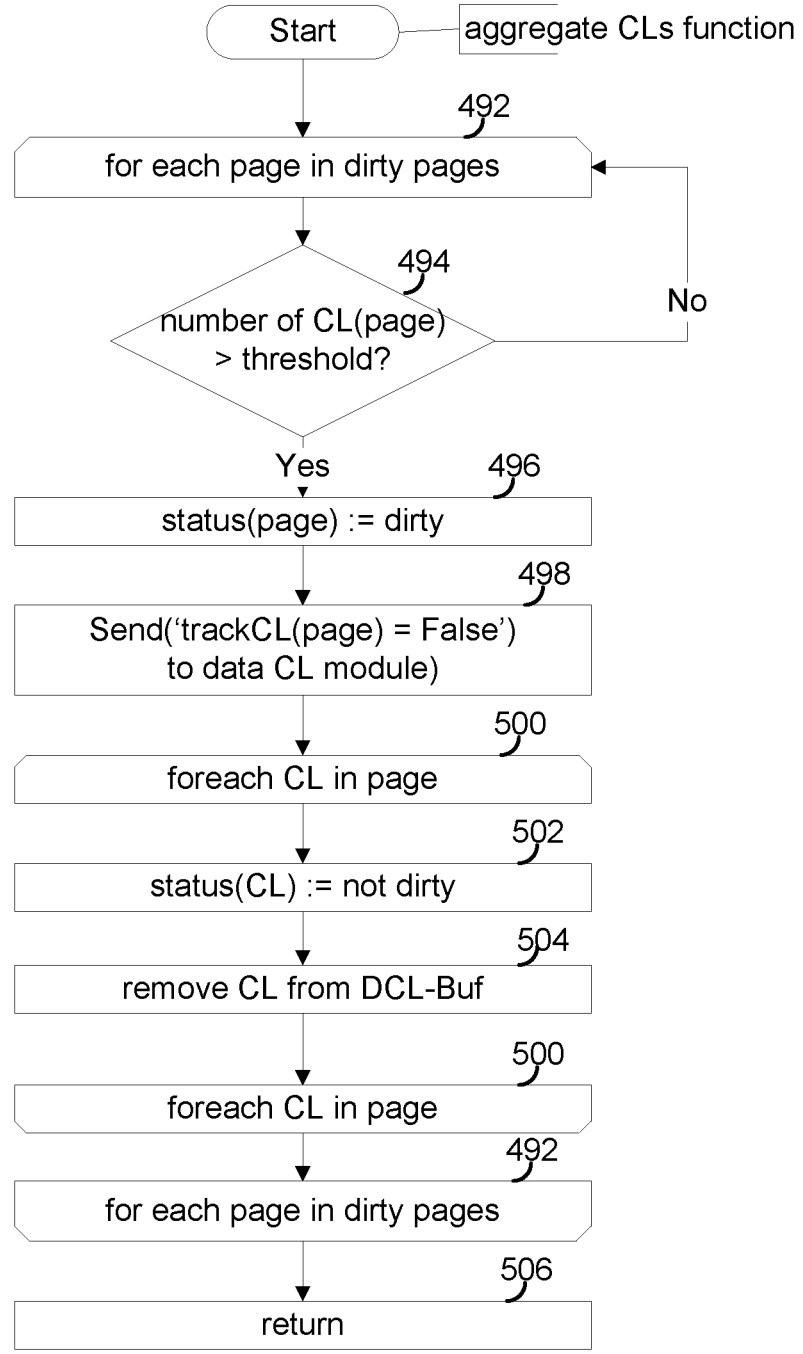
FIG. 4E depicts a flow chart of the aggregate CLs function, in an embodiment.

FIG. 4E depicts a flow chart of the aggregate CLs function. Function 420 checks the number of dirty cache lines in a page to determine whether it is more efficient to declare the entire page dirty. In step 492, function 420 starts an iterator over each page in the set of dirty pages. In step 494, function 420 tests whether the number of dirty cache lines in a page exceeds a threshold. If so, then in step 496, function 420 sets the status of the page as dirty and sends a 'trackCL(page)=False' message to data CL module 406 in step 498 to stop the tracking of cache lines for the page specified in the message because enough cache lines are dirty that the entire page is considered dirty and there is no need to track individual cache lines. In step 500, function 420 starts an iterator over the cache lines in the page. Within the iterator, in step 502, function 420 marks the cache line (CL) in the page as not dirty and in step 404 removes the entry representing the CL from DCL-Buf 410. Function 420 returns after both iterators are completed. Thus, if the entire page is declared dirty, the DCL-Buf 410 entries are adjusted accordingly. When an entire page is declared dirty, it is more efficient to copy the entire page to the remote destination in one operation that all of its component cache lines. In one embodiment, function 420 is included in application-specific modules 218 in FPGA 112, which performs steps 492-506.

These modules and functions thus maintain the consistency of the page transferred from the remote to the local memory in a more efficient manner because page faults are not used to track the dirty pages and only dirty cache lines need to be updated at the remote memory. Efficiency is also improved in some embodiments by declaring the entire page dirty when enough cache lines in the page are dirty and transferring the entire page.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for handling remote memory requests for a running application on a local host, comprising:
    receiving a request for a page from the running application, wherein the page is not stored at a local memory of the local host, the local host being a first computer system comprising the local memory and at least one first processor;
    obtaining the page for the running application from a remote host responsible for the page, the remote host being a second computer system comprising a memory and at least one second processor, wherein the local host is coupled to the remote host by a network;
    determining whether any cache line of the page becomes dirty due to activities of the running application by monitoring cache coherence events relating to each cache line of the page on a coherence interconnect established between two different processors; and
    periodically copying dirty cache lines of the page to the remote host.

2. The method of claim 1, wherein determining whether any cache line becomes dirty includes adding an entry representing the dirty cache line into a dirty cache line buffer when a cache coherence event indicates that the cache line is dirty.

3. The method of claim 2, wherein periodically copying the dirty cache lines to the remote host includes removing an entry representing a corresponding copied cache line from the dirty cache line buffer.

4. The method of claim 2,
    further comprising determining whether a number of dirty cache lines in the page exceeds a threshold; and
    if the number of dirty cache lines in the page exceeds the threshold, marking the page as dirty, and removing entries relating to the dirty cache lines of the page from the dirty cache line buffer.

5. The method of claim 1,
    further comprising performing a flush operation at a request of the running application;
    wherein performing the flush operation includes copying all dirty cache lines to the remote host.

6. The method of claim 1, further comprising adding the page to the local memory after obtaining the page.

7. The method of claim 6, further comprising copying all dirty cache lines to the remote host when the local memory becomes full.

8. The method of claim 1, further comprising copying all dirty cache lines to the remote host when the running application closes a memory region containing the page.

9. The method of claim 1, wherein obtaining the page for the running application from the remote host responsible for the page includes obtaining the page via a remote direct memory access (RDMA) operation.

10. The method of claim 1, wherein the two different processors comprise the at least one first processor and a third processor.

11. The method of claim 1, further comprising:
determining whether a number of dirty cache lines in the page exceeds a threshold; and
if the number of dirty cache lines in the page exceeds the threshold, marking the page as dirty.

12. A logic device of a local host running an application, the logic device comprising:
a request handling circuitry configured to:
receive a request for a page from the running application, wherein the page is not stored at a local memory of the local host, the local host being a first computer system comprising the local memory and at least one first processor; and
obtain the page for the running application from a remote host responsible for the page, the remote host being a second computer system comprising a memory and at least one second processor, wherein the local host is coupled to the remote host by a network;
a data cache line circuitry configured to determine whether any cache line of the page becomes dirty due to activities of the running application by monitoring cache coherence events relating to each cache line of the page on a coherence interconnect established between two different processors on the local host; and
a dirty cache lines copy circuitry configured to periodically copy dirty cache lines of the page to the remote host.

13. The device of claim 12,
wherein determining whether any cache line of the page becomes dirty includes adding an entry representing the dirty cache line into a dirty cache line buffer when a cache coherence event indicates the cache line is dirty.

14. A system for handling remote memory requests, the system including:
a local processor running an application;
a local memory; and
a programmable logic device containing a cache coherence module for monitoring cache coherence events of the local processor,
wherein the programmable logic device is configured to:
receive a request for a page from the running application, wherein the page is not stored at the local memory;
obtain the page for the running application from a remote host responsible for the page, the remote host being a second computer system comprising a memory and at least one second processor, wherein the system is coupled to the remote host by a network;
determine whether any cache line of the page becomes dirty due to activities of the running application by monitoring cache coherence events relating to each cache line of the page on a coherence interconnect established between two different processors on the system; and
periodically copy dirty cache lines of the page to the remote host.

15. The system of claim 14,
further comprising a dirty cache line buffer;
wherein the programmable logic device being configured to determine whether any cache line becomes dirty includes the programmable logic device being configured to add an entry representing the dirty cache line into a dirty cache line buffer when a cache coherence event indicates that the cache line is dirty.

16. The system of claim 15, wherein the programmable logic device being configured to periodically copy the dirty cache lines to the remote host includes the programmable logic device being configured to remove entries representing the copied dirty cache lines from the dirty cache line buffer.

17. The system of claim 15, wherein the programmable logic device is further configured to:
determine whether a number of dirty cache lines in the page exceeds a threshold; and
if the number of dirty cache lines in the page exceeds the threshold, mark the page as dirty, and remove entries relating to the dirty cache lines of the page from the dirty cache line buffer.

18. The system of claim 14,
wherein the programmable logic device is further configured to perform a flush operation at a request of the running application; and
wherein being configured to perform the flush operation includes being configured to copy all dirty cache lines to the remote host.

19. The system of claim 14, wherein the programmable logic device is further configured to copy all dirty cache lines to the remote host when the running application closes a memory region containing the page.

20. The system of claim 14,
further comprising a remote direct memory access (RDMA) facility connected to the remote host;
wherein the programmable logic device being configured to obtain the page for the running application from the remote host responsible for the page includes the programmable logic device being configured to obtain the page via an RDMA operation.

21. The system of claim 14,
wherein the programmable logic device is further configured to add the page to the local memory after obtaining the page.

22. The system of claim 21, wherein the programmable logic device is further configured to copy all dirty cache lines to the remote host when the local memory becomes full.

\* \* \* \* \*